US009755772B1

(12) United States Patent
Eshaq et al.

(10) Patent No.: US 9,755,772 B1
(45) Date of Patent: Sep. 5, 2017

(54) VEHICLE COMMUNICATION SYSTEM FOR RECEIVING FREQUENCY MODULATION AND DIGITAL AUDIO BROADCAST RADIO FREQUENCY BANDS

(71) Applicant: GM Global Technology Operations LLC, Detroit, MI (US)

(72) Inventors: Nahel Eshaq, Sterling Heights, MI (US); David S. Cheney, Wixom, MI (US); Runhong Deng, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/063,178

(22) Filed: Mar. 7, 2016

(51) Int. Cl.
*H04H 20/86* (2008.01)
*H04H 20/71* (2008.01)
*H04B 1/3822* (2015.01)

(52) U.S. Cl.
CPC .......... *H04H 20/86* (2013.01); *H04B 1/3822* (2013.01); *H04H 20/71* (2013.01)

(58) Field of Classification Search
CPC ...... H01Q 1/32; H04H 2201/20; H04H 20/26; H03F 2200/294; H04B 1/18
See application file for complete search history.

(56) References Cited

U.S. PATENT DOCUMENTS

| | | | | |
|---|---|---|---|---|
| 2006/0022881 A1* | 2/2006 | Yegin | ........................ | B60R 1/12 343/713 |
| 2006/0220970 A1* | 10/2006 | Aminzadeh | .......... | H01Q 1/3275 343/713 |
| 2010/0035468 A1* | 2/2010 | Perrot | .................. | H01Q 1/1207 439/607.01 |
| 2010/0098195 A1* | 4/2010 | Nekhamkin | ........ | H04L 27/0014 375/344 |
| 2010/0109955 A1* | 5/2010 | Anguera | ................ | H01Q 1/243 343/702 |
| 2010/0189194 A1* | 7/2010 | Dawkins | ............... | G06F 1/3203 375/316 |
| 2010/0234071 A1* | 9/2010 | Shabtay | ............... | H04B 7/0408 455/562.1 |
| 2011/0102278 A1* | 5/2011 | Rozan | ...................... | B60R 1/12 343/713 |
| 2011/0142178 A1* | 6/2011 | Huang | ..................... | H04B 1/18 375/340 |
| 2012/0056674 A1* | 3/2012 | Sagebiel | .............. | H03G 3/3052 330/293 |
| 2012/0056791 A1* | 3/2012 | Cisneros Gonzalez | | H01Q 1/1278 343/704 |
| 2012/0081253 A1* | 4/2012 | Duzdar | .................. | H01Q 21/28 343/713 |
| 2012/0082271 A1* | 4/2012 | Elenes | ................... | H04H 20/30 375/343 |
| 2012/0098715 A1* | 4/2012 | Dai | ...................... | H01Q 1/1278 343/712 |
| 2012/0140859 A1* | 6/2012 | Lehr | .................... | H04B 1/0064 375/344 |

(Continued)

*Primary Examiner* — Devan Sandiford
(74) *Attorney, Agent, or Firm* — Christopher DeVries; Reising Ethington P.C.

(57) ABSTRACT

An antenna system for a vehicle that includes at least one radio frequency (RF) antenna that receives both a digital audio broadcasting (DAB) RF broadcast and a frequency modulation (FM) RF broadcast. A single amplifier coupled to one or more antennas is used to process both the DAB and FM broadcasts.

8 Claims, 4 Drawing Sheets

(56) References Cited

U.S. PATENT DOCUMENTS

| | | | | |
|---|---|---|---|---|
| 2012/0249270 A1* | 10/2012 | Li | ............................ | H04B 1/18 |
| | | | | 334/78 |
| 2013/0084818 A1* | 4/2013 | Croman | ............ | H04W 52/0245 |
| | | | | 455/226.1 |
| 2013/0265500 A1* | 10/2013 | Kalbus | ................... | H04H 60/39 |
| | | | | 348/729 |
| 2014/0015717 A1* | 1/2014 | Kowalewicz | ......... | H01Q 1/3275 |
| | | | | 343/715 |
| 2014/0073276 A1* | 3/2014 | Iyer | ...................... | H03J 1/0008 |
| | | | | 455/179.1 |
| 2014/0292593 A1* | 10/2014 | Thiam | ................... | H01Q 1/3275 |
| | | | | 343/713 |
| 2015/0222006 A1* | 8/2015 | Dai | ........................ | H01Q 13/10 |
| | | | | 343/712 |
| 2015/0222010 A1* | 8/2015 | Dai | ........................ | H01Q 1/50 |
| | | | | 343/713 |
| 2016/0056851 A1* | 2/2016 | Kerselaers | ............. | H04B 17/29 |
| | | | | 455/180.1 |
| 2016/0064807 A1* | 3/2016 | Reed | ................... | H01Q 1/3275 |
| | | | | 343/713 |
| 2016/0241350 A1* | 8/2016 | Nekhamkin | ........ | G10L 19/0019 |

* cited by examiner

VEHICLE COMMUNICATION SYSTEM FOR RECEIVING FREQUENCY MODULATION AND DIGITAL AUDIO BROADCAST RADIO FREQUENCY BANDS

TECHNICAL FIELD

The present invention relates to a vehicle communication system, and more particularly, to receiving radio frequency (RF) transmissions via a vehicle antenna system.

BACKGROUND

In some regions of the world, digital audio broadcasting (DAB) in the L-band (e.g., approximately 1.0-2.6 gigahertz or GHz) is being phased out (e.g., becoming obsolete). In at least some regions, other forms of DAB radio are being implemented; e.g., DAB Band III (or simply DAB III). Thus, there is a need to implement a DAB III antenna system in a vehicle.

SUMMARY

According to an embodiment of the invention, there is provided an antenna system for a vehicle. The antenna system includes at least one radio frequency (RF) antenna and an amplifier coupled to the antenna. The amplifier may be adapted to amplify a digital audio broadcasting (DAB) RF band and a frequency modulation (FM) RF band.

According to an embodiment of the invention, there is provided a communication system for a vehicle. The communication system includes an antenna system that includes an antenna and a low noise amplifier (LNA), wherein the LNA is configured to amplify a digital audio broadcasting (DAB) radio frequency (RF) band and a frequency modulation (FM) RF band. The communication system also includes a vehicle infotainment system (VIS) and a communication connection coupling the antenna system and the VIS. The VIS may be adapted to receive amplified electrical signals associated with RF transmissions in the DAB and FM RF bands thereafter provide vehicle audio based on the received electrical signals.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

A communication system is described below that includes an antenna system which is adapted to minimize the number of components needed for operation, while still maintaining the capability of receiving multiple radio frequency bands. For example, the number of antennas can be minimized, the number of antenna-receiver amplifiers can be minimized, the number of cable connections between the antenna system and a vehicle head unit can be minimized, and/or the number of components within the head unit can be reduced.

Communications System—

Figure 1:
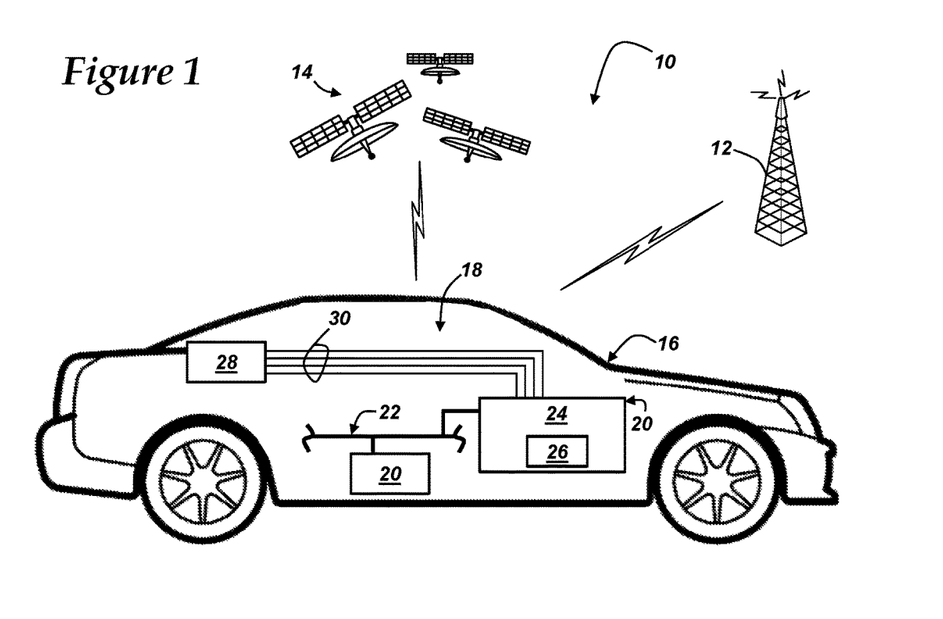
FIG. 1 is a block diagram depicting a vehicle having a communication system that includes an antenna system coupled to a vehicle infotainment system (VIS)

With reference to FIG. 1, there is shown an operating environment that comprises a mobile vehicle communications system 10 that generally includes: one or more radio transmission systems 12, one or more satellites 14, and a vehicle 16 comprising a communication system 18. As will be described in greater detail below, the communication system 18 may receive radio frequency (RF) communication from satellite(s), radio transmission systems 12, and the like and provide a variety of services to user(s) of vehicle 16.

The radio transmission system(s) 12 (illustrated as a radio tower) may include any suitable broadcasting infrastructure, including but not limited to, transmitter components, control devices, and the like. As used herein, systems 12 pertain to amplitude modulated (AM) radio, frequency modulated (FM) radio, high-definition (HD) AM and/or FM radio (e.g., HD1, HD2, HD3, etc.), digital audio broadcasting (DAB), and the like. Radio transmission system(s) 12 broadcast content over-the-air receivable by radio antennas carried by a number of devices, including vehicle 16 (as will be explained more below).

In at least one implementation, the constellation of satellites 14 shown in FIG. 1 may transmit location data via radio signals that enable vehicle 16 to provide navigation data and/or other position-related services to vehicle users. For example, the vehicle 16 may comprise a global navigation satellite system (GNSS) device which utilizes global positioning system (GPS) data, GLONASS data, and the like. Other satellites may broadcast other content; e.g., such as music, news, etc. One non-limiting example is Sirius XM™ radio.

Vehicle 16 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Vehicle 16 may include electronics such as one or more microphones (not shown), one or more pushbuttons or other control inputs (not shown), and a telematics unit (not shown). Thus, vehicle 16 may be adapted for two-way communication—e.g., via a wireless carrier system (e.g., for communication with other devices via CDMA, GSM, LTE, or the like) and/or a land communication network (e.g., with one or more servers or a backend system providing one or more backend services to vehicle 16—e.g., according to a subscription agreement or the like). Further, vehicle 16 may comprise one or more vehicle system modules (VSMs) 20 coupled to another via a communication network connection or bus 22. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Vehicle system modules (VSM) 20 may be embodied as electronic hardware components located throughout the vehicle 16 and typically receive input from one or more sensors and use the sensed input to perform diagnostic, monitoring, control, reporting and/or other functions. Non-limiting examples of VSMs 20 include a body control module (BCM) for controlling power locks, headlights, etc., an engine control module (ECM) for controlling fuel ignition, ignition timing, etc., an on-board diagnostics module (OBDM) for reporting diagnostic trouble codes and the like. As will be appreciated by those skilled in the art, the above-mentioned VSMs are only examples of some of the modules that may be used in vehicle 16, as numerous other examples are also possible.

In at least one embodiment, one of the VSMs 20 is a center stack module (CSM) or head unit or vehicle infotainment system (VIS) 24. The VIS 24 may include any suitable electronics, software, etc. for providing vehicle entertainment and vehicle infotainment services to the vehicle users and/or occupants. For example, the VIS 24 may include memory (not shown), one or more processors or processing units (not shown), one or more players or memory interfaces (e.g., a CD or DVD player, an MP3 player) (not shown), and one or more tuning units 26. The tuning unit(s) 26 may be adapted for tuning or control of AM radio, FM radio, XM or satellite radio, and the like. And the tuning unit(s) may be tunable using user-voice-control or manual pushbuttons, knobs, etc.

FIG. 1 also illustrates the communication system 18 that includes the VIS 24, an antenna system 28 coupled to the VIS 24 via multiple connections 30 (e.g., coaxial or other suitable cables). In one embodiment (shown in FIG. 2), the antenna system 28 includes an antenna bank 32 of antennas 34-44 and associated proximately located amplifiers 46-52 (e.g., low noise amplifiers or LNAs). Skilled artisans will appreciate that locating an amplifier relatively near a radio antenna enables amplification of a received radio signal (which may be relatively weak). The amplified signal then may be subject to less data loss (e.g., less losses due to electromagnetic interference and/or signal attenuation). For example, the amplified signal then could be processed elsewhere in the communication system 18; e.g., if the antenna system 28 were located on a vehicle rooftop, in a vehicle cabin pillar, at a vehicle rear window (e.g., in a defroster grid), or the like, the amplified signals could be processed at the VIS 24 (which may be located in a vehicle cabin-forward region).

Figures 2, 2A:
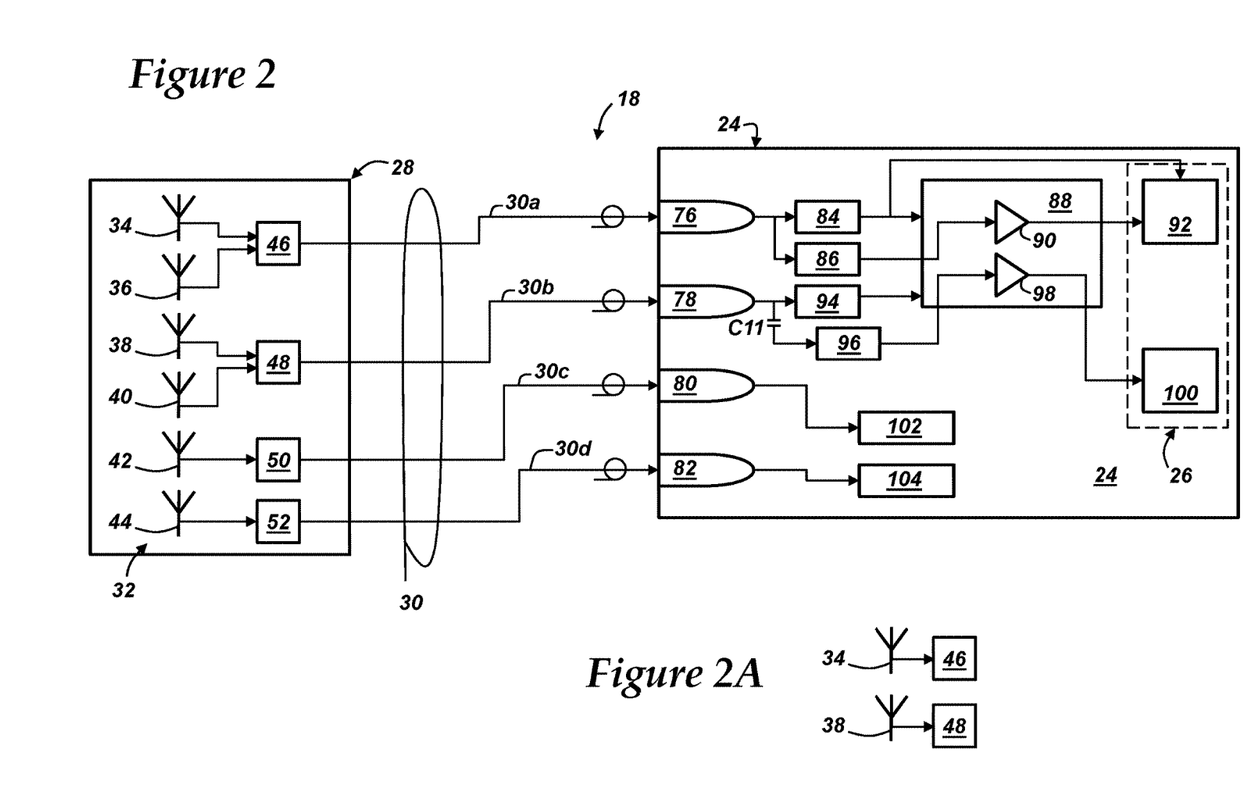
FIG. 2 is a schematic view of the communication system shown in FIG. 1.
FIG. 2A illustrates an alternative antenna embodiment of the communication system.

In FIG. 2, antennas 34-36 (e.g., AM and FM radio antennas, respectively) are coupled to LNA 46, antennas 38-40 (e.g., FM2 and digital audio broadcasting (DAB) radio antennas, respectively) are coupled to LNA 48, antenna 42 (e.g., an XM radio antenna) is coupled to LNA 50, and antenna 44 (e.g., a GLONASS communication antenna) is coupled to LNA 52. As will be appreciated by skilled artisans, the use of two FM antennas (e.g., having separate antennas and separate LNAs) may enable greater phase diversity, thereby improving the vehicle user experience. Non-limiting examples of antennas 34-44 include any combination of monopole antennas, dipole antennas, fractal antennas, loop antennas, or the like. It should be appreciated that FIG. 2 illustrates merely one embodiment of communication system 18. Other arrangements and/or other components are also possible (e.g., more or fewer antennas and/or amplifiers may be used instead). For example, FIG. 2A illustrates a single antenna 34 coupled to LNA 46 and a single antenna 38 coupled to LNA 48.

The LNAs 46-52 represent electrical circuits or amplifier modules for amplifying received radio frequency transmissions. At least one LNA (e.g., LNA 48) may be configured to receive multiple RF transmissions associated with different RF bandwidths. For example, in at least one embodiment, LNA 48 may receive and amplify RF transmissions associated with FM2 radio and digital audio broadcasting (DAB) radio (e.g., DAB Band III or simply DAB III). The bandwidth of FM2 includes frequencies of 87.5-108.0 MHz (or megahertz) (or 87.9-107.9 in North America), whereas DAB III, e.g., utilizes frequencies that include 174-230 MHz.

Figure 3A:
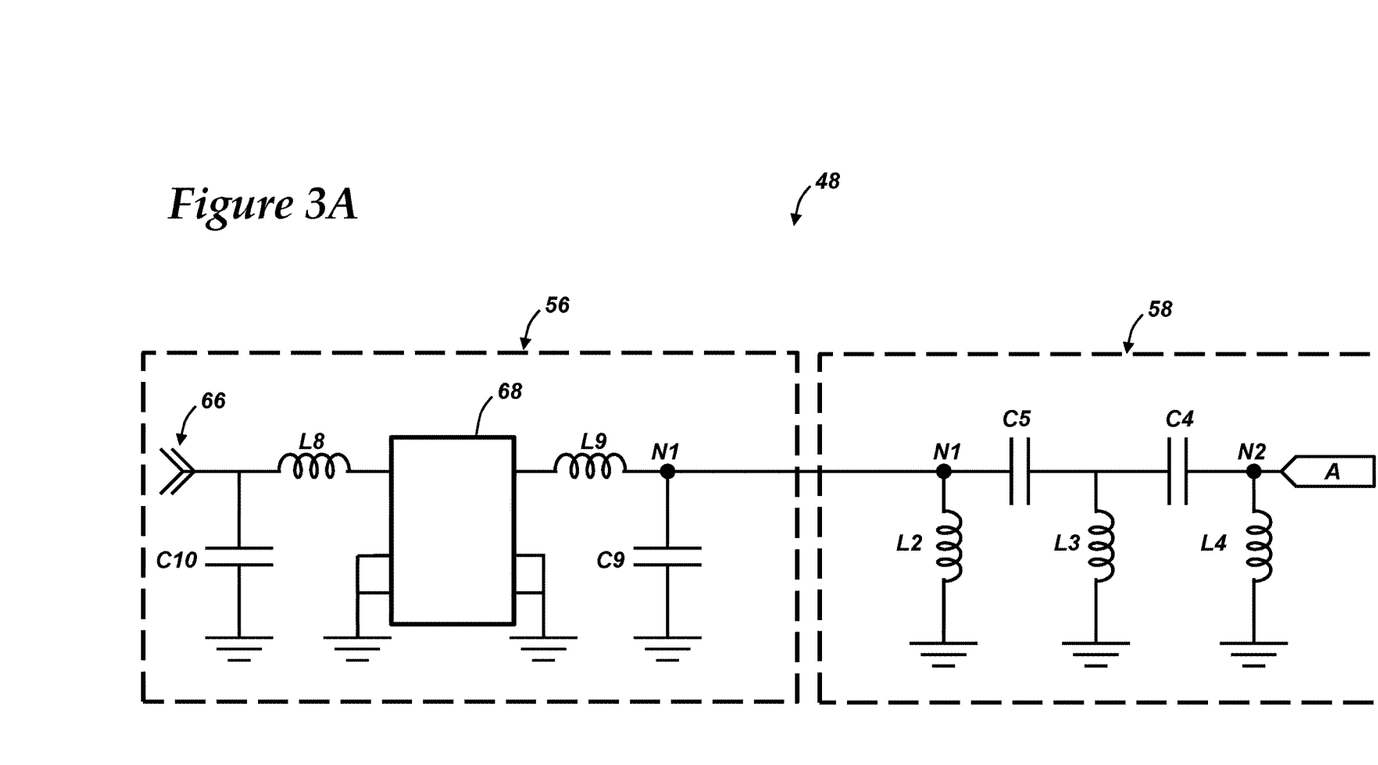
FIGS. 3A-3B are an electrical diagram illustrating one embodiment of a low noise amplifier circuit in the antenna system.
Figure 3B:
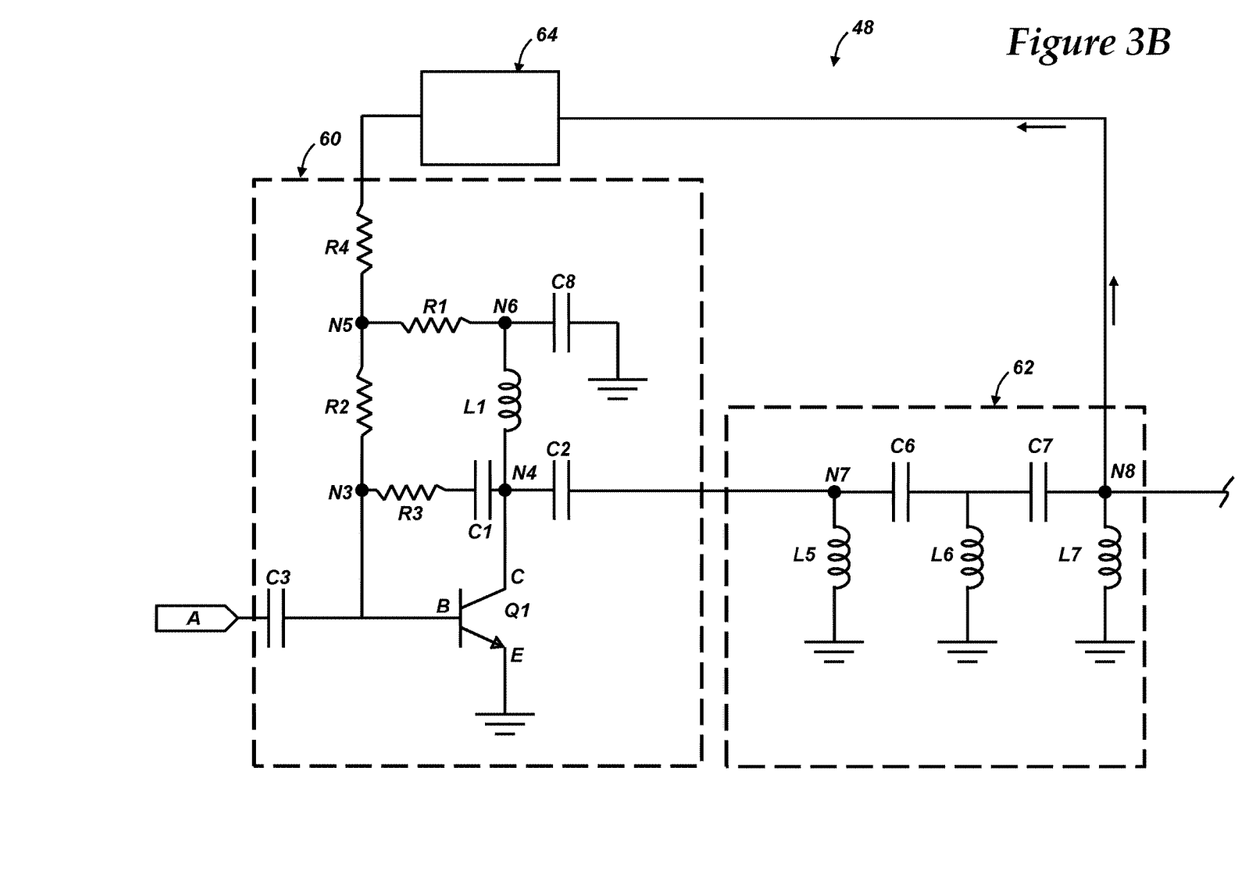

FIGS. 3A-3B illustrate an illustrative embodiment of LNA 48 that includes an RF input circuit 56, a first matching circuit 58, a biasing circuit 60, a second matching circuit 62, and a voltage regulator circuit 64. Each of these circuits includes components and arrangements which exemplify a particular embodiment. Other implementations are contemplated herein as well.

In at least one embodiment, the RF input circuit 56 may be a dual bandpass front end filter with matching components to suppress all or a substantial portion of the out-of-band noise. In this manner, the circuit 56 inhibits the noise from being amplified by the LNA 48 and ultimately thereafter sent to one of the respective tuning units 26.

The first matching circuit 58 may tune the LNA input impedance and further may narrow the bandwidth of the LNA 48. The value of the input impedance may affect the gain and stability of the LNA, as those terms are understood by skilled artisans.

The biasing circuit 60 may include an RF transistor (Q1) which may be used to set amplification and/or filtering parameters or characteristics of the LNA—e.g., by switching on and off the electrical current consumed by the LNA. The transistor may be tunable (on/off) via the matching circuits 58, 62.

The second matching circuit 62 may behave at least partially similarly to the first matching circuit 58—i.e., it also may tune the LNA input impedance and further narrow the bandwidth of the LNA 48. Collectively, the first and second matching circuits 58, 62 may be used to control the parameters of the LNA 48 as well, as discussed above. Further, both circuits 58, 62 may be monitored during operation—e.g., and may be responsive to input changes.

The voltage regulator circuit 64 may be adapted to regulate phantom power (e.g., or voltage) provided by the VIS 24. In at least one aspect, the regulated power is adapted to power LNA 48. Other design and operational aspects of regulator circuits will be appreciated by skilled artisans. The circuits 56, 58, 60, 62, and 64 are described in greater detail below.

The illustrated RF input circuit 56 includes an RF input lead 66—e.g., which may be coupled to at least one antenna (e.g., antennas 38, 40). In at least one other embodiment, the RF input lead 66 is coupled to a single antenna (e.g., antenna 38). The lead 66 is coupled to two circuit branches: one branch having capacitor C10 (and ground), and the other branch having inductor L8, a surface acoustic wave (or SAW) bandpass filter 68, and inductor L9 coupled in series. Parameters of the SAW bandpass filter may vary according to a desired frequency band to be passed therethrough; e.g., in at least one embodiment, passing frequencies may include frequencies between 87-230 MHz. Also, the SAW bandpass filter is merely an example; in other implementations, other filters could be used instead. Inductor L9 further is coupled to two circuit branches via node N1: one branch having capacitor C9 (and ground), and the other branch connecting to the first matching circuit 58.

Node N1 is coupled to two additional circuit branches of first matching circuit 58: one branch having inductor L2 (and ground), and the other branch including capacitor C5. And capacitor C5 further is coupled to two additional circuit branches: one branch having inductor L3 (and ground), and the other branch including capacitor C4. And capacitor C4 further is coupled to two branches at node N2: one branch having inductor L4 (and ground), and the other branch connecting the first matching circuit 58 to the biasing circuit 60. More or fewer inductors and/or capacitors may be similarly arranged in other embodiments.

Node N2 also is coupled to capacitor C3 of the biasing circuit 60. And capacitor C3 is further coupled to two additional circuit branches: one branch is coupled to a base B of an NPN transistor Q1, and the other branch is coupled to node N3. The emitter E of transistor Q1 is coupled to ground, and the collector C thereof is coupled to node N4. Nodes N3 and N4 are coupled to one another via resistor R3 and capacitor C1—which are in series, respectively. Node N3 also is coupled to node N5 via resistor R2. And node N5 is coupled to two additional branches: one additional branch connects node N5 to the voltage regulator circuit 64 via resistor R4, and the second additional branch connects node N5 to node N6 via resistor R1. Node N6 is coupled to two additional circuit branches as well: one branch connects node N6 to node N4 via inductor L1, while the second additional branch connects node N6 to ground via capacitor C8. Node N4 further connects the biasing circuit 60 to node N7 of the second matching circuit 62 via capacitor C2.

Node N7 is coupled to two additional circuit branches in the second matching circuit 62: one branch having inductor L5 (and ground), and the other branch including capacitor C6. And capacitor C6 further is coupled to two additional circuit branches: one branch having inductor L6 (and ground), and the other branch including capacitor C7. And capacitor C7 further is coupled to two additional branches at node N8: one branch having inductor L7 (and ground), and the other branch connecting the second matching circuit 62 to both an LNA output and the voltage regulating circuit 64. More or fewer inductors and/or capacitors may be similarly arranged in other embodiments.

The voltage regulating circuit 64 may be any suitable regulating circuit adapted to receive and regulate phantom power from the VIS 24. As used herein, phantom power includes direct current (DC) electric power transmitted via one of the connections 30 (e.g., via node N8)—e.g., where the connection 30 is used for both power and signal data. Further, the LNA circuit 48 may be configured to provide an output in accordance with a predetermined impedance (e.g., 50 Ohm or the like).

The LNA circuit 48 described above is merely one implementation. Other configurations are also possible. Further, the values of resistors R1-R4, capacitors C1-C10, and inductors L1-L9 may be any suitable values. Similarly, in other embodiments, other transistors and/or other components may be used instead.

Returning to FIG. 2, LNAs 46-52 are shown coupled to VIS 24 via connections 30 (e.g., via connections 30a-30d). And connections 30a-30d are coupled VIS input connectors 76-82, respectively. As discussed above, connections 30 may be any suitable connections—e.g., such as coaxial cables or the like.

Connector 76—e.g., in one embodiment, receiving AM and FM1 frequencies—may be coupled to two parallel bandpass filters 84, 86. Filter 84 may be adapted to filter AM and FM1 frequencies (e.g., 0.540-108 MHz), whereas filter 86 may be adapted to filter only FM1 frequencies (e.g., 88-108 MHz). The outputs of both filters 84, 86 may be received by a signal processing module 88—at least one of the signals (e.g., from filter 86 (FM1 only)) may be buffered using a buffer and low noise amplifier circuit 90. The output of buffer 90 may be received by the tuning unit 26, and more specifically by a tuning module 92. The tuning module 92 may comprise a radio data system (RDS)/traffic message channel (TMC). The operation and implementation of RDS/TMC and other associated technology is generally known in the art. FIG. 2 also illustrates that another output of filter 84 may be connected directly to tuning module 92; i.e., the signal is not amplified or buffered.

Connector 78—e.g., in one embodiment, receiving FM2 and DAB III frequencies—may be coupled to two other parallel bandpass filters 94, 96. More specifically, filter 94 may be connected directly, whereas filter 96 may be coupled to filter 96 via capacitor C11. Filter 94 may be adapted to filter FM2 frequencies (e.g., 88-108 MHz), whereas filter 96 may be adapted to filter DAB frequencies (e.g., DAB III) (e.g., 174-230 MHz). The outputs of both filters 94, 96 may be received by the signal processing module 88—and at least one of the signals (e.g., from filter 96 (DAB III)) may be amplified and buffered using a buffer and low noise amplifier circuit 98. The output of buffer 98 may be received by the tuning unit 26, and more specifically by a tuning module 100. Tuning module 100 may comprise a DAB tuner; the operation and implementation of the DAB tuner and other associated technology is generally known in the art.

FIG. 2 illustrates that connectors 80, 82 are coupled to modules 102, 104, respectively. In at least one embodiment, connector 80 receives satellite radio signals (e.g., XM) and module 102 is a satellite receiving unit, and connector 82 receives navigation RF signals and module 104 is a GLONASS or GPS receiving unit. It should be appreciated that once the modules 92, 100, 102, 104 receive AM, FM1, FM2, DAB III, XM, GLONASS, etc. signals, these electrical signals may be made available to users of the vehicle 16 as acoustic signals or audible sound.

Figure 4:
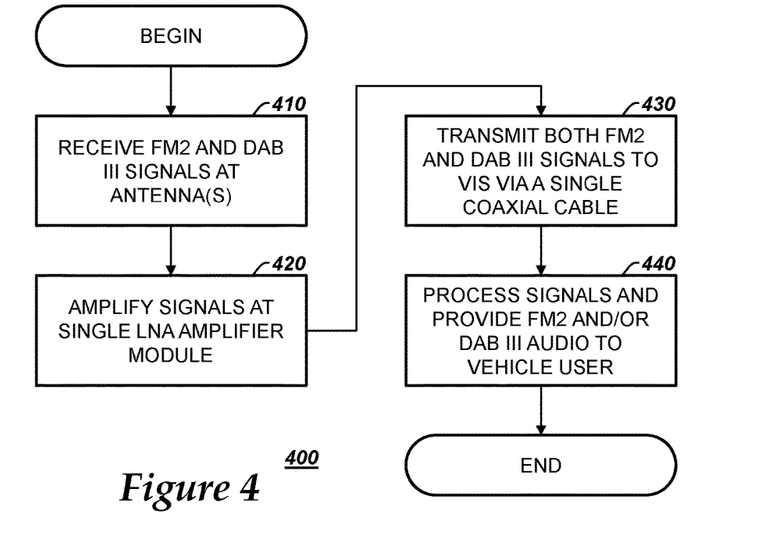
FIG. 4 is a flow diagram illustrating a method of operating the communication system.

A flow diagram is shown in FIG. 4 illustrating a method 400 of operation of the communication system 18. The method begins with step 410. In this step, the antenna system 28 receives radio frequency (RF) transmissions across a number of frequency bands. In at least one embodiment, the antenna system 28 receives at least FM2 frequency transmissions and DAB III frequency transmissions. In one embodiment, the FM2 and DAB III frequencies are received by antennas 38 and 40; in another embodiment, a single antenna (e.g., 38 or 40) is coupled to LNA 48 and receives the FM2 and DAB III frequencies. For example, a single antenna may be configured wherein the antenna acts as a half-wave for DAB III frequencies and acts as a quarter-wave for FM2 frequencies. Of course, in some embodiments, the antenna system 28 also may receive RF transmissions via more or all RF antennas 34-44.

Step 420 follows step 410. In step 420, LNA 48 is used to amplify at least the FM2 and DAB III frequencies. For example, in accordance with the electrical circuit shown in FIGS. 3A-3B, unwanted frequencies may be filtered out, while the remaining frequencies (e.g., between 87-230 MHz) may be amplified. This pre-filtering and amplification within the antenna system 28 may be performed by LNAs 46, 50, 52 as well.

Step 430 follows step 420. In step 430, the output of LNA circuit (or module) 48—i.e., the electrical signal at node N8—is transmitted via connection 30b. And in at least one embodiment, the connection 30b may be a single cable (e.g., a single coaxial cable). Step 430 may include transmission of other signals from LNAs 46, 50, 52 via connections 30a, 30c, 30d, respectively.

In step 440 which follows step 430, the signals received via connectors 76-82 may be further processed and used by a vehicle user. For example, the electrical signal(s) representing FM2 and DAB III frequencies may be received via connector 30b, filtered by filters 94, 96, buffered via buffer 98—in the case of the DAB III signal, and provided to tuning unit 26. Thereafter, these signals then may be provided to the user—e.g., when the VIS 24 is tuned to the desired frequency, band, or channel.

It should be appreciated that the present communication system 18 may minimize components used by the antenna system 28, the connection 30, and the VIS 24. For example, antenna system 28 may use a single antenna to receive signals across multiple frequency bands—e.g., only antenna 34 or antenna 36 could be used to receive both AM and FM1 RF transmissions, and only antenna 38 or antenna 40 could be used to receive both FM2 and DAB III transmissions. Further, LNA 48 (or even LNA 46) may be a single module or circuit configured to filter and/or amplify the RF transmissions at the antenna system 28 (e.g., filter and/or amplify both FM2 and/or DAB III transmissions)—e.g., instead of having a separate FM2 module and a separate DAB module.

Components of the connections 30 also may be minimized. For example, instead of having dedicated or separate coaxial cables for electrical signals representing FM2 and for DAB III, the output of LNA 48 may be communicated via a single cable 30b. Similarly, electrical signals from LNA 46 (AM and FM1) may be communicated via single connection 30a. Other implementations also are contemplated.

Components of the VIS 24 also may be minimized. For example, if the VIS 24 had five connectors (e.g., instead of four connectors 76-82) and five corresponding electrical signals carrying information associated with five different RF transmissions, then additional VIS hardware would be required. For example, VIS 24 might require an additional bandpass filter, splitters, etc.

Thus, the present implementation may utilize a single antenna, a single LNA, a single connection, and fewer VIS components—to receive and provide two or more frequency bands (e.g., AM, FM1, FM2, DAB III, etc.) to the vehicle user. For example, AM and FM1 frequency bands may be provided via a single LNA (46) and/or FM2 and DAB III frequency bands may be provided via a single LNA (48).

A vehicle communication system has been described herein that includes a vehicle infotainment system (VIS), an antenna system, and a connection therebetween. The antenna system may utilize a single low noise amplifier (LNA) to receive two or more radio frequency bands. According to the LNA design, the quantity of components of the VIS, antenna system, and connection may be reduced.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. An antenna system for a vehicle, comprising:
   at least one radio frequency (RF) antenna; and
   an amplifier coupled to the antenna, wherein the amplifier is adapted to amplify a digital audio broadcasting (DAB) RF band and a frequency modulation (FM) RF band;
   wherein the amplifier comprises a first matching circuit and a second matching circuit, each of the matching circuits being associated with one of the DAB RF band or the FM RF band; and
   wherein amplifier comprises a single output via the second matching circuit.

2. The antenna system of claim 1, wherein the amplifier is adapted to amplify a DAB III RF band and an FM2 RF band.

3. The antenna system of claim 1, wherein the amplifier is coupled to a single RF receiving antenna.

4. An antenna system for a vehicle, comprising:
   at least one radio frequency (RF) antenna;
   an amplifier coupled to the antenna, wherein the amplifier is adapted to amplify a digital audio broadcasting (DAB) RF band and a frequency modulation (FM) RF band;
   wherein the amplifier comprises a first matching circuit and a second matching circuit, each of the matching circuits being associated with one of the DAB RF band or the FM RF band; and
   an RF input circuit, a biasing circuit, and a voltage regulator circuit, wherein the RF input circuit, the first matching circuit, the biasing circuit, and the second matching circuit are coupled to one another in series, wherein the voltage regulator circuit is coupled to the biasing circuit and an output of the second matching circuit.

5. A communication system for a vehicle, comprising:
   an antenna system that includes an antenna and a low noise amplifier (LNA), wherein the LNA is configured to amplify a digital audio broadcasting (DAB) radio frequency (RF) band and a frequency modulation (FM) RF band;
   a vehicle infotainment system (VIS); and
   a communication connection coupling the antenna system and the VIS,
   wherein the VIS is adapted to receive amplified electrical signals associated with RF transmissions in the DAB and FM RF bands thereafter provide vehicle audio based on the received electrical signals;
   wherein the LNA comprises a first matching circuit and a second matching circuit, each of the matching circuits being associated with one of the DAB RF band or the FM RF band; and
   wherein LNA comprises a single output via the second matching circuit.

6. The communication system of claim 5, wherein the LNA is adapted to amplify a DAB III RF band and an FM2 RF band.

7. The communication system of claim 5, wherein the LNA is coupled to a single RF receiving antenna.

8. The communication system of claim 5, wherein the LNA further comprises an RF input circuit, a biasing circuit, and a voltage regulator circuit, wherein the RF input circuit, the first matching circuit, the biasing circuit, and the second matching circuit are coupled to one another in series, wherein the voltage regulator circuit is coupled to the biasing circuit and an output of the second matching circuit.

\* \* \* \* \*